US008693526B2

(12) United States Patent
Wildey

(10) Patent No.: US 8,693,526 B2
(45) Date of Patent: Apr. 8, 2014

(54) UNIPOLAR SPREAD SPECTRUM MODULATION FOR LOW COMPUTATION AND POWER COST SIGNAL MULTIPLEXING WITH APPLICATION TO FNIRS MEASURMENTS

(75) Inventor: Chester Roy Wildey, Euless, TX (US)

(73) Assignee: Chester Wildey, Euless, TX (US)

( * ) Notice: Subject to any disclaimer, the term of this patent is extended or adjusted under 35 U.S.C. 154(b) by 0 days.

(21) Appl. No.: 13/398,796

(22) Filed: Feb. 16, 2012

(65) Prior Publication Data

US 2013/0215934 A1  Aug. 22, 2013

Related U.S. Application Data

(60) Provisional application No. 61/443,251, filed on Feb. 16, 2011.

(51) Int. Cl.
*H04B 1/707* (2011.01)
(52) U.S. Cl.
USPC ........... 375/147; 375/140; 375/141; 375/142; 375/144; 375/146; 375/148; 375/150; 375/316; 375/346
(58) Field of Classification Search
USPC ......... 375/140, 141, 142, 144, 146, 147, 148, 375/150, 316, 346
See application file for complete search history.

(56) References Cited

U.S. PATENT DOCUMENTS

| | | | | |
|---|---|---|---|---|
| 5,760,941 A * | 6/1998 | Young et al. | ................. | 398/183 |
| 6,614,950 B2 * | 9/2003 | Huang et al. | .................... | 385/15 |
| 6,631,158 B2 * | 10/2003 | Lipponen et al. | ............. | 375/150 |
| 7,356,220 B2 * | 4/2008 | Chung et al. | .................... | 385/27 |
| 7,364,550 B1 * | 4/2008 | Turcott | ........................ | 600/526 |
| 7,729,201 B2 * | 6/2010 | Wildey | .......................... | 367/40 |
| 8,229,015 B2 * | 7/2012 | Takai et al. | ................... | 375/267 |
| 2002/0097779 A1 * | 7/2002 | Bang et al. | .................... | 375/144 |
| 2003/0185101 A1 * | 10/2003 | Wildey | ........................ | 367/101 |
| 2006/0122583 A1 * | 6/2006 | Pesach et al. | ..................... | 606/7 |
| 2009/0016735 A1 * | 1/2009 | Schmitz et al. | .............. | 398/140 |

* cited by examiner

*Primary Examiner* — Siu Lee

(57) ABSTRACT

This invention teaches a way to multiplex and de-multiplex unipolar signals using spread spectrum methods. While bipolar spread spectrum signal multiplexing may be used in may applications, for example for systems using radio signals, when using unipolar signals there is a loss of orthogonally which makes the standard algorithms unworkable. This invention teaches a method to recover orthogonally and make spread spectrum multiplexing useful for unipolar signals. One example is in the measurement of optical absorbance along multiple paths simultaneously using light signals, as for functional near infrared spectroscopy (fNIRS).

20 Claims, 5 Drawing Sheets

| i | H1 | H2 | H3 | R | H1 x R | H2 x R | H3 x R | (H1xR)-(H3xR) | (H2xR)-(H3xR) |
|---|---|---|---|---|---|---|---|---|---|
| 1 | 0 | 1 | 1 | 1 | 0 | 1 | 1 | -1 | 0 |
| 2 | 0 | 1 | 0 | 1 | 0 | 1 | 0 | 0 | 1 |
| 3 | 1 | 0 | 1 | 1 | 1 | 0 | 1 | 0 | -1 |
| 4 | 1 | 1 | 0 | 2 | 2 | 2 | 0 | 2 | 2 |
| 5 | 0 | 0 | 1 | 0 | 0 | 0 | 0 | 0 | 0 |
| 6 | 1 | 1 | 1 | 2 | 2 | 2 | 2 | 0 | 0 |
| 7 | 1 | 0 | 0 | 1 | 1 | 0 | 0 | 1 | 0 |
| 8 | 0 | 0 | 0 | 0 | 0 | 0 | 0 | 0 | 0 |
| Sums: | 4 | 4 | 4 | 8 | 6 | 6 | 4 | 2 | 2 |

FIG. 5

UNIPOLAR SPREAD SPECTRUM MODULATION FOR LOW COMPUTATION AND POWER COST SIGNAL MULTIPLEXING WITH APPLICATION TO FNIRS MEASURMENTS

This application claims priority benefit from U.S. Provisional Patent Application No. 61/443,251, which was filed on Feb. 16, 2011.

FIELD OF THE INVENTION

This invention relates to measurement methods which interrogate the physical properties of a system under test by supplying external energy, allowing the supplied energy to be modified by the system under test, recovering the modified energy, and analyzing the modification of the energy to discover the system under test's physical properties. Specifically this invention relates to the subset of measurement methods where the supplied energy is modulated by the method of direct sequence spread spectrum, where the energy signal is unipolar in nature, and where more than one signal exists simultaneously either due to simultaneous application of probe signals or due to environmental variables producing more than one response signal or both.

BACKGROUND OF THE INVENTION

Direct sequence spread spectrum (dsss) modulated energy may be used to measure characteristics of a system under test by detecting modulation imposed on the dsss energy by the system. The most typical methods involve phase modulation and amplitude modulation by the system under test. In the case of phase modulation a time delay is imposed, for example when the energy propagates in the system under test at some known velocity. The phase delay would then be recovered by correlation analysis of varying phase delays of the imposed and recovered signals. In the case of amplitude modulation the energy would be changed in amplitude due to the system under test, for example if the energy were dissipated in a system element. The amplitude would then be recovered as proportional to the amplitude of the correlation coefficient of the imposed and recovered signals with zero phase delay between the two. The advantages of using dsss energy as a probe include immunity to interference from other signals, low probability of interference with other signals in the system that exist concurrent with the probe signal, and processing gain which results from the many independent chip measurements represented by the dsss probe energy.

The use of a dsss modulated signal to measure the distance and velocity of objects using ultrasonic energy was disclosed by Wildey in U.S. Pat. No. 7,729,201. Wildey discusses a system wherein a dsss modulated ultrasonic signal is launched toward a surface in a tank, the reflected energy is captured by an ultrasonic transducer, and the resulting phase delay in the dsss ultrasonic signal carries information on the distance from the transducer to the surface. Typically multiple surfaces exist and so multiple reflections represent a simultaneous multiplexed measurement of several target surfaces. Wildey also discloses a system wherein the target objects may be encompassed in a moving fluid where the dsss energy would be Doppler shifted by the relative velocity of the target and the emitting transducer as well as phase shifted by the distance travelled to and from the target object. The dsss modulation method disclosed uses bipolar modulation, i.e. it uses dsss modulation patterns consisting of patterns of +1,-1, levels.

In U.S. Pat. No. 7,069,163, Gunther discloses a system to measure the locations of wire faults in an aircraft by probing with dsss modulated energy. The wire fault, consisting of a short or open circuit, creates an impedance mismatch at the fault. A dsss modulated signal is injected into the wire and is modified by the fault, recovered from the wire and analyzed by correlation with the transmitted dsss pattern to determine phase delay and thus the location of the fault. The system uses orthogonal dsss codes, i.e. bipolar or +1,-1, codes.

It is a goal of the present invention to present a method of probing a system under test using unipolar dsss signals, where unipolar dsss is defined as a set of +1,0, signals as compared to a bipolar dsss set of +1,-1 signals.

It is another goal of the present invention to allow restoration of orthognality to simultaneous unipolar dsss measurements where the recovered energy represents multiple system-modified versions of the externally supplied energy.

It is another goal of the present invention to allow restoration of orthogonality between codes in the multiplexed recovered signal for the case of the probe energy encompassing multiple simultaneous dsss unipolar signals.

SUMMARY OF THE INVENTION

A method is provided to enable simultaneous orthogonal measurements using a unipolar dsss probe signal. When using traditional bipolar dsss signals for measurement, the probe signals will be chosen from an orthogonal signal set, for example Walsh codes or PN codes. These are bipolar sequences, where the elements of the codes consist of +1, and −1,, with each symbol (the +1, or −1) occupying a single chip in the sequence. Since the codes are orthogonal, simultaneous measurement using distinct codes from an orthogonal set are independent; that is they do not interfere with each other. This enables a multiplexed measurement system.

In order to meet the orthogonally condition, the correlation of two distinct codes from an orthogonal signal set must be equal to zero. Correlation of two dsss signals involves multiplying the two signals chip by chip and summing the results. For such a sum to result in zero correlation, there must be a balance between +1, and −1, symbols. For a unipolar code with elements of +1, and 0, created for example by replacing the −1, symbol with 0, no such balance between positive and negative exists, and so the orthogonality condition is not met. The result is that when probe energy is modulated using unipolar codes the measurements are not independent, and there is cross-interference between the signals. The measurements are thus rendered erroneous.

In order to restore orthogonality, it is necessary to determine the cross-interference term between the unipolar codes, which can then be subtracted from the result, thus yielding accurate measurements. This is accomplished by correlating the multiplexed recovered signal by a unipolar code from the set, but which was not used to modulate probe energy. The resulting product yields the cross-interference term, which may then be used to correct the erroneous measurements.

BRIEF DESCRIPTION OF THE DRAWINGS

FIG. 5 shows the steps of demodulating and subtracting between the demodulating results.

DETAILED DESCRIPTION OF THE PREFERRED EMBODIMENT

The present invention teaches a method whereby unipolar dsss modulated energy may be used to make multiplexed measurements of a system. For clarity of explanation, and without loss of generality, the method will be described in reference to a specific measurement application. The measurement application used to clarify the method is functional near infrared spectroscopy (fNIRS). fNIRS measurements use light to probe functional activations in the cerebral cortex. Two optical measurement wavelengths are used to determine the concentration of oxygenated and de-oxygenated hemoglobin, which are biomarkers for neural activation. Typically fNIRS systems use tomographic methods to reconstruct images of brain activations and so require many light sources and light detectors spatially distributed on the head. Since this is a multiplexed optical measurement where each light detector receives energy from multiple light sources, and since the light sources used do not allow control of the light phase, the measurement is amenable to the unipolar dsss method described here, but is not amenable to bipolar dsss modulation methods.

Figure 1:
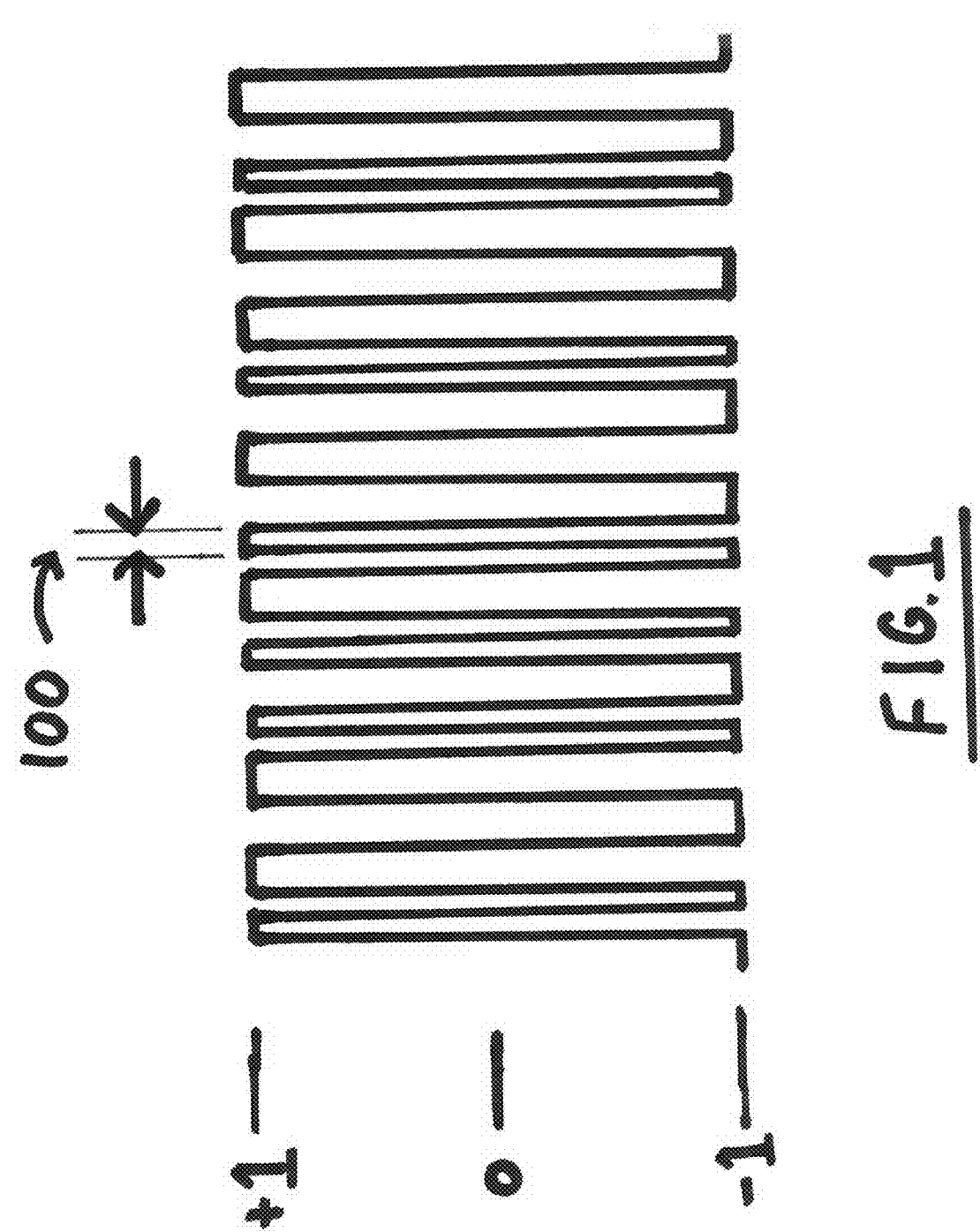
FIG. 1 is an example of portion of a bipolar dsss signal.
Figure 2:
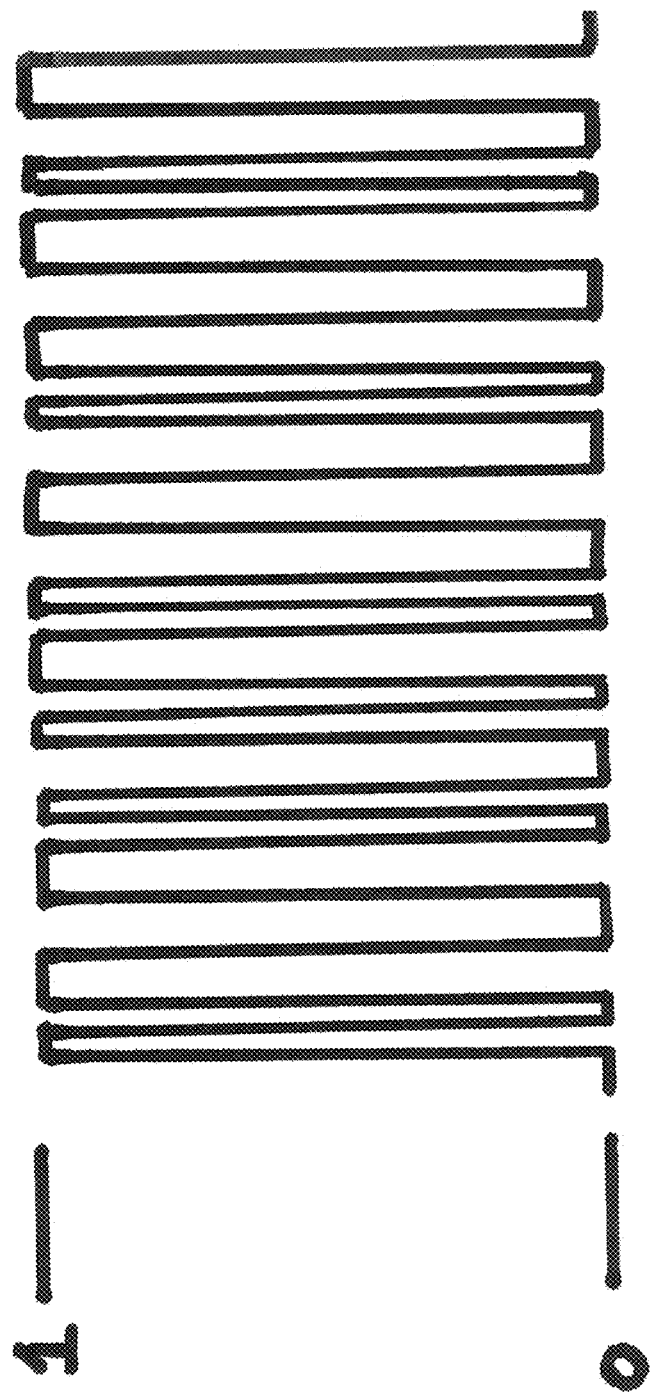
FIG. 2 is an example of a portion of a unipolar dsss signal.

FIG. 1 shows the signal plot of a typical bipolar dsss signal. The signal takes on two levels, +1, and −1. The signal takes on one of these two values for each time interval, called a chip time 100. Typical dsss signals may be composed of dozens to thousand to millions or more of chip times before the signal repeats the cycle. Dsss signals from an orthogonal set have the characteristic that the correlation between any two signals in the set is equal to zero. FIG. 2 shows a unipolar dsss signal. The signal is similar to the bipolar dsss signal, but takes on the values of +1, or 0, for each chip time. This unipolar modification, substituting 0 for −1, destroys the orthogonality of the signals and renders them unsuitable for multiplexed measurements. It is the purpose of the method described here to restore the orthogonality of the signals and thus restore their usefulness for multiplexed measurements.

Figure 3:
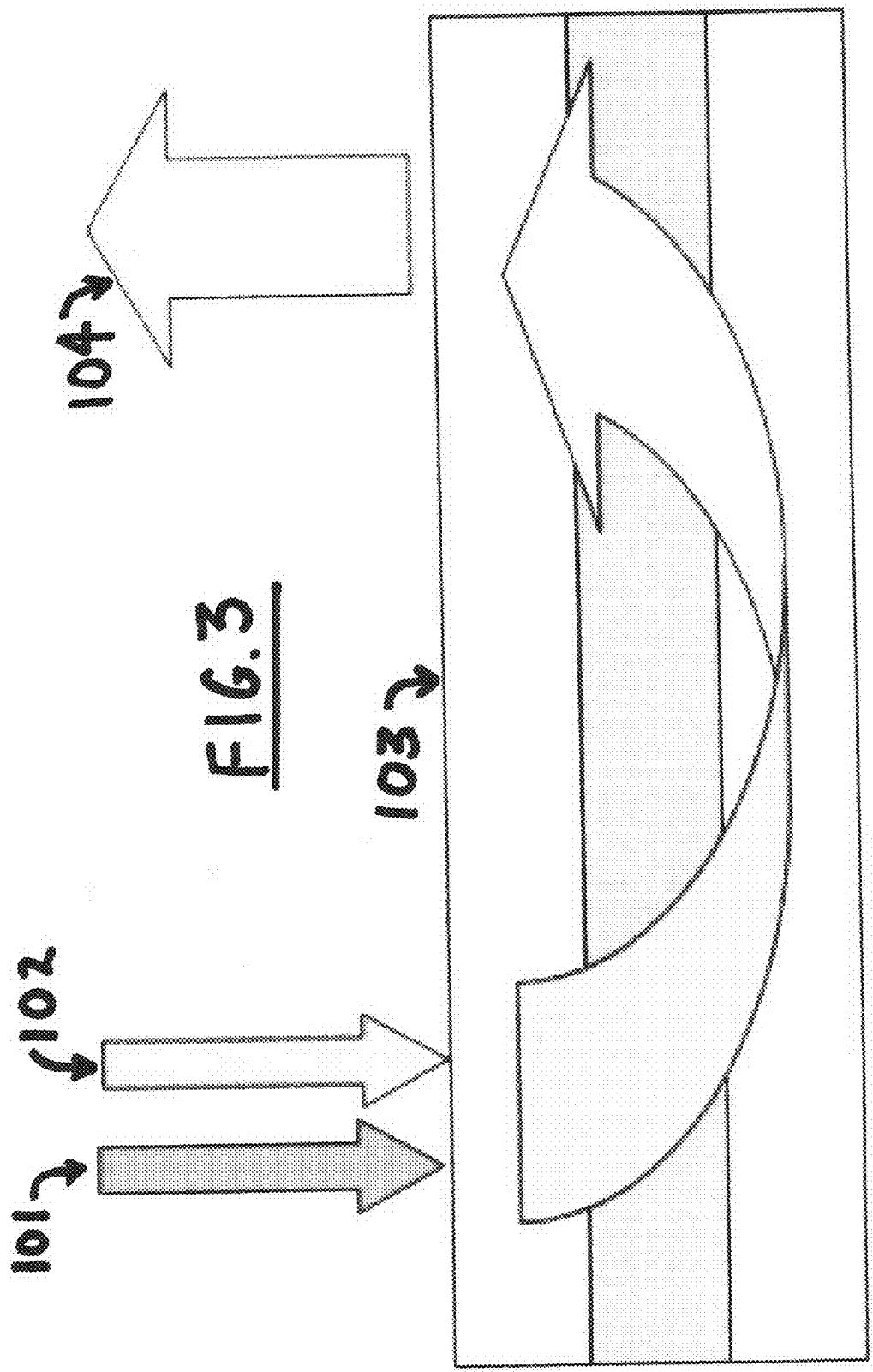
FIG. 3 is system where two energy sources are transmitted into a common system and the multiplexed, system-imprinted signal is recovered.

FIG. 3 shows two illumination sources 101 102 impinging on a surface, in this case the skin of the head 103, with the received signal 104 being a superposition of the signal from the two illuminators modified by the light absorption characteristics of the oxy/deoxy hemoglobin in the tissues of the head. To clarify operation if bipolar codes could be used, let unique dsss bipolar codes from an orthogonal set be used to modulate each illuminator. Equation 1, shows the orthogonality condition for the codes. Thus each code C is a function of time which when multiplied by another code and the result summed yields a product of zero. Equation 2, shows the result of the measurement of FIG. 3 when the modulating amplitudes from the tissue absorbance for illuminators 1, and 2, are A1 and A2, respectively.

$$\sum_{i=1}^{m} C_k(i)C_j(i) = \begin{cases} 0, & j \neq k \\ 1, & j = k \end{cases} \quad \text{eq 1}$$

$$sig(i) = A_1 C_1(i) + A_2 C_2(i) \quad \text{eq 2}$$

Equation 3, represents the received signal sig(i) multiplied by code 1. This result is expanded in equations 4, through 6, to yield equation 7, which shows that the amplitude A1, is recovered along with a product of codes C2, and C1. Since the orthogonality condition requires that the product of {+1,−1}, codes be zero, this completes the proof for signal separation when using such bipolar codes.

$$\text{Received Signal} * \text{Code1} = \sum_{i=1}^{m} sig(i)C_1(i) \quad \text{eq 3}$$

$$= \sum_{i=1}^{m} [(A_1 C_1(i) + A_2 C_2(i))C_1(i)] \quad \text{eq 4}$$

$$= \sum_{i=1}^{m} A_1 C_1(i)C_1(i) + \quad \text{eq 5}$$

$$\sum_{i=1}^{m} A_2 C_2(i)C_1(i)$$

$$= \sum_{i/C_1=1} A_1(1)(1) + \quad \text{eq 6}$$

$$\sum_{i/C_1=-1} A_1(-1)(-1) +$$

$$\sum_{i=1}^{m} A_2 C_2(i)C_1(i)$$

$$= mA_1 + \sum_{i=1}^{m} A_2 C_2(i)C_1(i) \quad \text{eq 7}$$

$$= mA_1$$

At this point we discuss the physical significance of the {+1,−1} codes. As dsss was first developed for radio transmission it is clear that the code represents a phase shift with the +1, condition representing a shift of 0, degrees and −1, representing a shift of 180, degrees. Since the carrier signal in this application is light (where the illuminators phase may not be controlled) and the detection of the light receiver represents envelope demodulation, it is clear that {+1,−1} codes may not be used but that {0,1} codes may be used. This represents on-off keying (ook) of the transmitted light. A reasonable question then is how using ook effects the orthogonal multiplexing scheme. Equation 8, shows the received signal for the {0,1} case. This is expanded in equation 9, to yield equation 10, which shows recovery of A1, reduced by ½ along with a co-modulation product of code C1, with code C2.

$$\text{Received Signal} * \text{Code1} = \sum_{i=1}^{m} sig(i)C_1(i) \quad \text{eq 8}$$

$$\underset{\substack{\text{Let } C \text{ be } 0,1 \text{ for} \\ \text{Optical Signaling}}}{C \in \{0, 1\}} = \sum_{i/C_1=1} A_1(1)(1) + \sum_{i/C_1=0} A_1(0)(0) + \quad \text{eq 9}$$

$$\sum_{i=1}^{m} A_2 C_2(i)C_1(i)$$

$$= \frac{m}{2} A_1 + \sum_{i=1}^{m} A_2 C_2(i)C_1(i) \quad \text{eq 10}$$

Examining the co-modulation product yields equation 11, whose terms it may be shown occur in the ratios shown in equation 12. Thus the result of using {0,1} spreading codes is bleed between the two illuminating signals in the ratio shown in equation 13. This bleed between signals must be eliminated for practical use of the codes in a signal multiplexing scheme.

$$\sum_{i=1}^{m} A_2 C_2(i) C_1(i) = \sum_{i/C_1=1 \cap C_2=1} A_2(1)(1) +$$

$$\sum_{i/C_1=1 \cap C_2=0} A_2(0)(1) +$$

$$\sum_{i/C_1=0 \cap C_2=1} A_2(1)(0) +$$

$$\sum_{i/C_1=0 \cap C_2=0} A_2(0)(0)$$

eq 11

$$= \sum_{\substack{i/C_1=1 \cap C_2=1 \\ 25\%}} A_2 - \sum_{\substack{i/C_1=1 \cap C_2=0 \\ 25\%}} 0 -$$

$$\sum_{\substack{i/C_1=0 \cap C_2=1 \\ 25\%}} 0 + \sum_{\substack{i/C_1=0 \cap C_2=0 \\ 25\%}} 0$$

eq 12

$$\sum_{i=1}^{m} sig(i) C_1(i) = \frac{m}{2} A_1 + \frac{m}{4} A_2$$

eq 13

Figure 4:
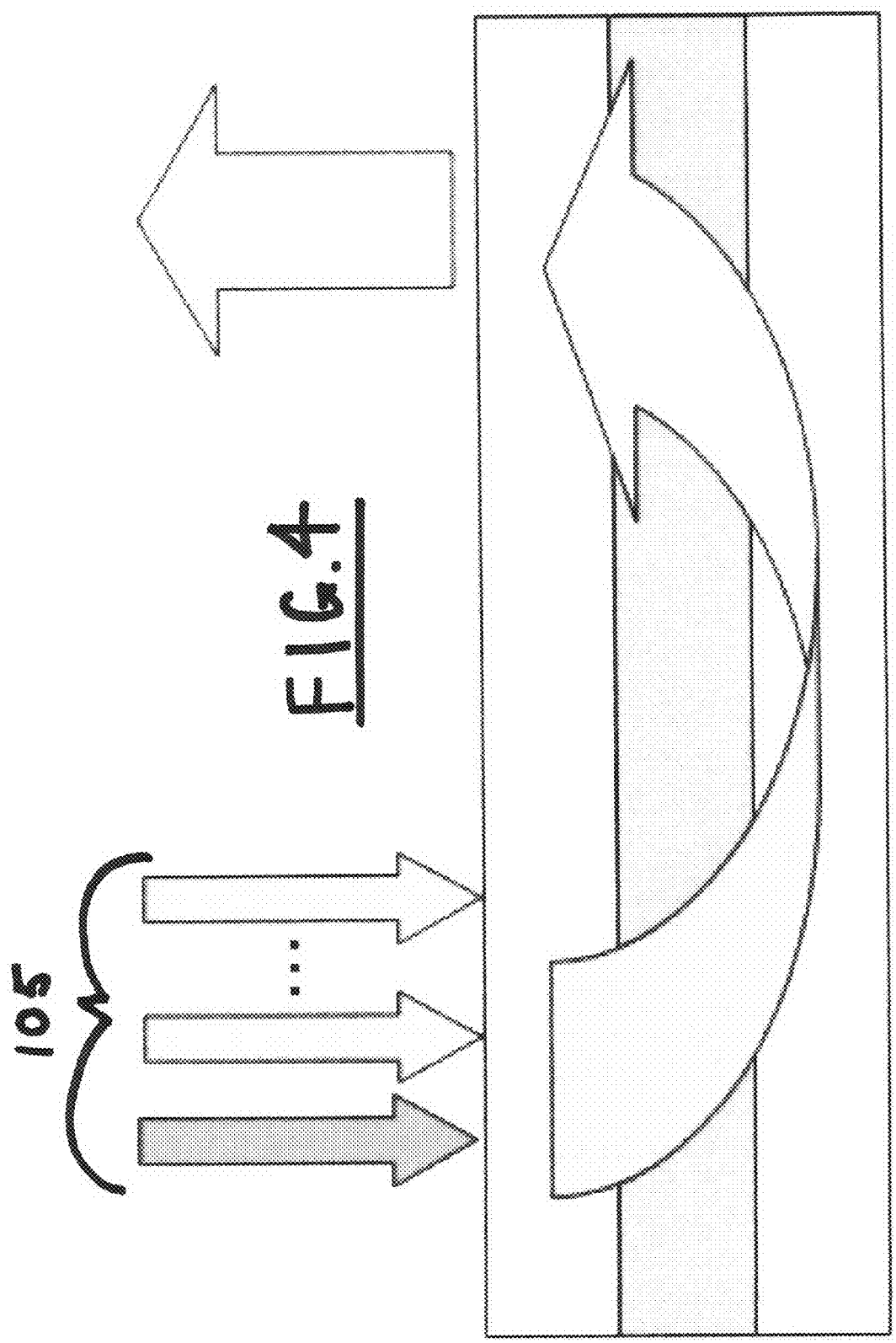
FIG. 4 is system where an arbitrary number of energy sources are transmitted into a common system and the multiplexed, system-imprinted signal is recovered.

Let FIG. 4 represent a NIRS system with an arbitrary number of illuminators 105. Then equation 14, represents the received multiplexed signal while equation 15, shows demodulation using code C1, and equation 16, shows the resulting loss of orthogonality due to using {0,1} spreading codes.

$$sig(i) = A_1 C_1(i) + A_2 C_2(i) + \ldots + A_n C_n(i)$$

eq 14

$$= \sum_{i=1}^{m} A_1 C_1(i) C_1(i) + \sum_{i=1}^{m} A_2 C_2(i) C_1(i) + \ldots +$$

$$\sum_{i=1}^{m} A_n C_n(i) C_1(i)$$

eq 15

$$= \frac{m}{2} A_1 + \frac{m}{4} \sum_{n=2}^{N} A_n$$

eq 16

Let code $C_{(N+1)}$, be an unused (i.e. not used to modulate a light source) from the orthogonal set of codes. Equation 17, shows the demodulation of the received signal using code $C_{(N+1)}$.

$$\sum_{i=1}^{m} sig(i) C_{N+1}(i) = \frac{m}{2} A_{n+1} + \frac{m}{4} \sum_{n=1}^{N} A_n$$

eq 17

Since code $C_{(N+1)}$, is not used to modulate a light source, then $A_{(N+1)}$, must by definition be zero, thus the remaining term represents the bleed signal from all other modulated light sources. This term may be subtracted from the demodulation terms of a specific light source using a specific code and will restore the orthogonality of the system for {0,1} codes as is shown in equation 18.

$$\sum_{i=1}^{m} sig(i) C_1(i) - \sum_{i=1}^{m} sig(i) C_{N+1}(i) = \frac{m}{4} A_1$$

eq 18

FIG. 5 expands the demodulating and subtracting processes represented in equation 18 in table form for the case of two transmitters and one receiver using orthogonal codes of length 8 (m=8) 106. The negative poles of the codes are replaced with zeros for three members of the set, H1, H2 and H3 107. In this example, H1 and H2 are associated with transmitters while H3 is associated with no transmitter. Without loss of generality, the amplitudes $A_n$ are set to 1, thus H1 and H2 combine to produce the receive signal as described by equation 14 108. The receive signal is demodulated using H1, H2 and H3, producing demodulation products 109. The demodulation product (H3×R) is subtracted from demodulation products (H1×R) and (H2×R) 110. With $A_1$ and $A_2$=1, and m=8, equation 18 determines that the subtraction product is 2, which result is shown 111.

I claim:

1. A method of transmission from at least one transmitter to at least one receiver and subsequent recovery of a transmitted signal, the method comprising the steps of:
    selecting a bipolar direct sequence orthogonal signal set;
    replacing one of the poles of the bipolar direct sequence orthogonal signal set with a value of 0, or essentially 0, creating a unipolar direct sequence non-orthogonal signal set;
    assigning at least one member of the unipolar direct sequence non-orthogonal signal set to each of the transmitters;
    reserving at least one member of the unipolar direct sequence non-orthogonal signal set from assignment to any transmitter;
    modulating the transmitters energy using the assigned unipolar direct sequence non-orthogonal signal set member for each transmitter, thus creating at least one transmitted signal;
    receiving a received signal containing at least one of the transmitted signals;
    correlating the received signal with one of the assigned unipolar direct sequence non-orthogonal signal set members, yielding a first correlation product;
    correlating the received signal with at least one of the reserved unipolar direct sequence non-orthogonal signal set members, yielding a second correlation product; and
    subtracting the second correlation product from the first correlation product to yield recovery of the transmitted signal associated with the unipolar direct sequence non-orthogonal signal set member used in the first correlation product.

2. The method of claim 1 further comprising repeating the correlating for the first correlation product, the correlating for the second correlation product, and subtracting steps until all desired transmit signals have been recovered.

3. The method of claim 1 further comprising repeating the correlating for the first correlation product, the correlating for the second correlation product, and subtracting steps for each received signal from each receiver.

4. The method of claim 3 further comprising repeating the correlation for the first correlation product, the correlating for the second correlation product, and subtraction steps until all desired transmit signals have been recovered.

5. The method of claim 1 wherein the transmitted signal consists of light.

6. The method of claim 1 wherein the transmitted signal consists of acoustic waves.

7. The method of claim 1 wherein the transmitted signal consists of radio waves.

8. The method of claim 1 wherein the transmitted signal is essentially unipolar.

9. The method of claim 1 wherein the bipolar direct sequence orthogonal signal set consists of Walsh codes.

10. The method of claim 1 wherein the bipolar direct sequence orthogonal signal set is derived from Hadamard matrices.

11. The method of claim 1 wherein the bipolar direct sequence orthogonal signal set consists of maximal length sequences.

12. The method of claim 1 wherein the bipolar direct sequence orthogonal signal set consists of Gold codes.

13. The method of claim 1 wherein the bipolar direct sequence orthogonal signal set consists of PN sequences.

14. The method of claim 1 wherein the bipolar direct sequence orthogonal signal set is generated using a linear feedback shift register.

15. The method of claim 1 wherein the bipolar direct sequence orthogonal signal set is replaced with a second signal set consisting of essentially orthogonal direct sequence spread spectrum codes.

16. The method of claim 1 wherein the replaced pole in the bipolar direct sequence orthogonal signal set is the negative pole.

17. The method of claim 1 wherein the replaced pole in the bipolar direct sequence orthogonal signal set is the positive pole.

18. The method of claim 1 wherein the modulating step employs amplitude modulation.

19. The method of claim 1 wherein the modulating step employs frequency modulation.

20. The method of claim 1 wherein the modulating step employs phase modulation.

\* \* \* \* \*